United States Patent Office 3,306,038
Patented Feb. 28, 1967

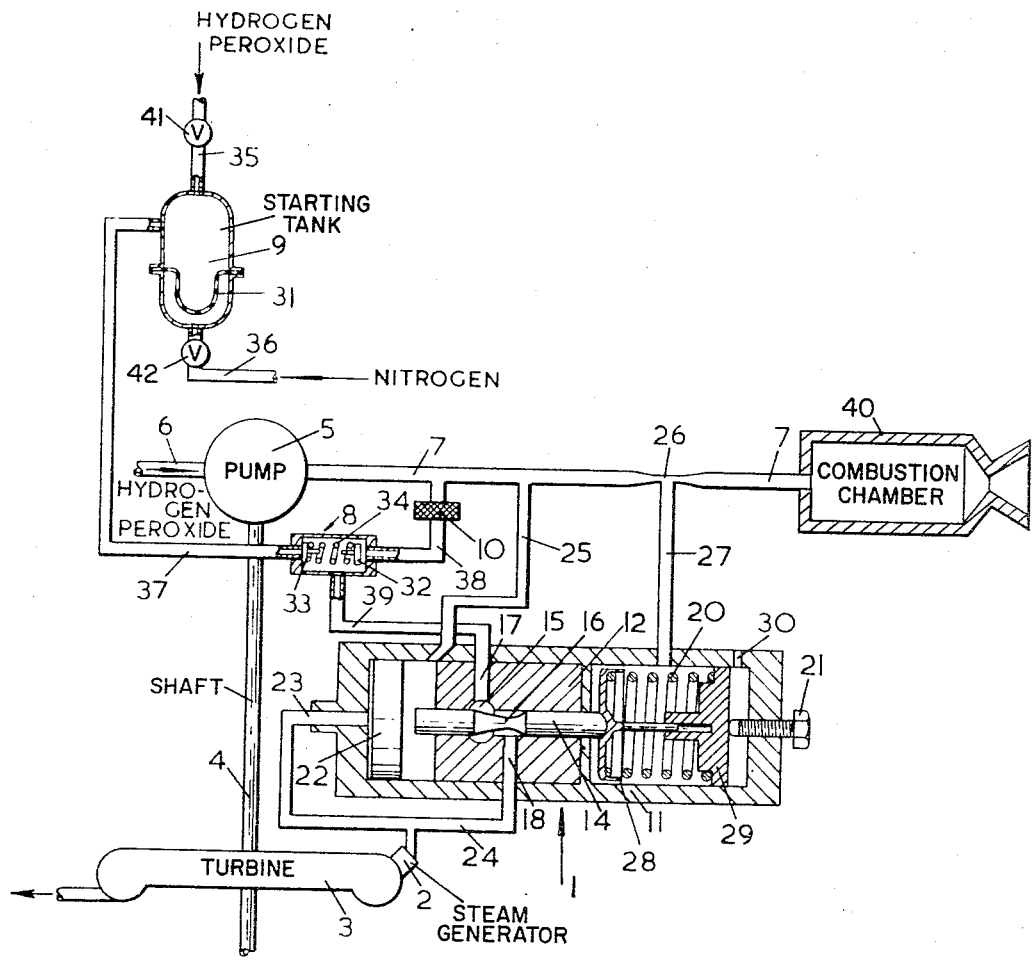

3,306,038
ROCKET ENGINE OXIDANT FEED SYSTEM
Victor Nigel Ferriman, Coventry, England, assignor to Bristol Siddeley Engines Limited, Bristol, England
Filed Aug. 14, 1964, Ser. No. 389,694
Claims priority, application Great Britain, Aug. 16, 1963, 32,478/63
5 Claims. (Cl. 60—39.29)

The invention relates to a rocket engine of the kind in which hydrogen peroxide or other oxidant and fuel are supplied to a combustion chamber by respective turbine-driven rotary pumps. The invention is particularly concerned with a rocket engine of the foregoing kind in which the oxidant is hydrogen peroxide and in which hydrogen peroxide is also supplied to a steam generator in which it is decomposed, the steam produced in the generator being used to rotate a turbine arranged to drive at least the oxidant pump. The hydrogen peroxide for the steam generator is supplied under pressure from a starting tank until the turbine has reached its operational speed, when the hydrogen peroxide may be supplied to the steam generator by the hydrogen peroxide pump.

An object of the invention is to provide in a rocket engine of the foregoing kind a control valve for restricting the speed of the turbine driving the oxidant pump during starting and to control the operational speed of the turbine so as to maintain a substantially constant delivery from the oxidant pump, or where both pumps are driven by the turbine from both pumps.

According to the invention, a control valve, for admitting working fluid to a turbine arranged to drive a pump for supplying oxidant to a combustion chamber of a rocket engine, includes a valve member movable to vary the flow area of a working fluid passage through the valve in response to the rate of flow of oxidant delivered by the pump, whereby the operational speed of the turbine is maintained substantially constant, the valve also including means operable on starting the turbine to limit the distance the valve member is permitted to travel in the direction of increasing flow area, thereby to limit the speed of the turbine.

Preferably the valve member is movable in response to the rate of the flow of oxidant delivered by the pump by the difference in pressure between pressure tappings taken respectively at the throat of a venturi in the pump delivery path and at a position upstream of the venturi throat.

The means for limiting the travel of the valve member may be operable in response to the difference between the pressure of the working fluid at a position between the valve member and the turbine and the pressure of oxidant in the pump delivery path.

Where the oxidant is hydrogen peroxide and the control valve is employed to admit hydrogen peroxide to a steam generator in which the hydrogen peroxide is to be decomposed and which is to supply steam to a turbine, arranged to drive the hydrogen peroxide pump, the control valve may comprise a housing including a chamber through which hydrogen peroxide is supplied to the steam generator, a first piston slidable in the chamber and co-operating therewith to define a flow path therethrough, the flow path being of variable flow area according to the position of the said piston in said chamber, spring means acting to urge said first piston towards the position of maximum flow area, a second piston slidable in said housing and engageable with one end of said first piston thereby to oppose said spring means, first and second pressure tappings in said housing at opposite ends of said first piston and arranged to communicate respectively with the throat of a venturi in the pump delivery path and a position upstream of the venturi throat, and a third pressure tapping in said housing, said second and third tappings being at opposite ends of said second piston and said third tapping being arranged to communicate with the flow path at a position downstream of the first piston, whereby on starting, the said second piston will move said first piston against the spring means to reduce the said flow area and thereby to limit the speed of the turbine and whereby, when the turbine has reached its operational speed, the second piston will have been moved away from said piston, thereby to permit the latter to be moved under the control of the first and second tappings to maintain the operational speed of the turbine substantially constant.

The invention also includes the combination of a control valve as set out in the preceding paragraph and a change-over valve operable to supply hydrogen peroxide from either a starting tank or the hydrogen peroxide pump through the control valve to the steam generator.

By way of example, a hydrogen peroxide control system, for a rocket engine in which hydrogen peroxide and fuel are supplied to a combustion chamber by respective rotary pumps and in which at least the hydrogen peroxide pump is arranged to be driven by a steam turbine supplied with steam obtained by the decomposition of hydrogen peroxide in a steam generator also supplied with hydrogen peroxide either from a starting tank or by the hydrogen peroxide pump, will now be described with reference to the accompanying diagrammatic drawing of the system including a longitudinal section of a control valve in accordance with the invention.

The control valve shown generally at 1 controls the flow of hydrogen peroxide to the steam generator 2 supplying steam to the steam turbine 3. The latter drives, through a shaft 4, the hydrogen peroxide pump 5 and may also drive a fuel pump (not shown). The pump 5 has an inlet pipe 6 leading from a main supply tank (not shown) and a delivery pipe 7 leading to the combustion chamber 40. The control valve 1 receives hydrogen peroxide via a change-over valve 8, which is either supplied from a starting tank 9, containing hydrogen peroxide, or from the delivery pipe 7 via a filter 10. The starting tank 9 contains hydrogen peroxide and may be provided with a filling pipe 35. The hydrogen peroxide is pressurised by nitrogen applied through a pipe 36 and separated from the hydrogen peroxide by a diaphragm 31. The pressurised hydrogen peroxide is conveyed from the starting tank 9 to the change-over valve 8 through a pipe 37. Valves 41, 42 are provided in the pipes 35 and 36 respectively to control the flow of hydrogen peroxide and nitrogen to the starting tank 9.

The control valve 1 comprises a housing 11 containing a cylindrical block 12, secured from movement in the housing and having a central throughway therein which slides a first piston 14; this being the aforesaid valve member. The block 12 includes an internal chamber 15, communicating with the throughway. The chamber 15 has an inlet 17 communicating via a pipe 39 with the change-over valve 8 and an outlet 18 communicating via a pipe 24 with the steam generator 2. A portion of the piston 14 is tapered at 16, in the vicinity of chamber 15, whereby, as the piston is moved from left to right as viewed in the figure, the flow area of flow path around the tapered portion 16 between the chamber 15 and the outlet 18 will be reduced and, as the piston is moved from right to left as viewed in the figure, the said flow area is increased. The piston 14 is urged in the direction giving increasing flow area by a spring 20 located between a pair of end caps 28 and 29. The end cap 28 bears against the adjacent end of the piston 14 and the cap 29 is engaged by an adjusting screw 21, which is adjustable to vary the compression of the spring 20. The housing has a vent 30 at the end adjacent the adjusting screw 21 thereby to permit the end cap 29 to move in the housing 11.

At the left-hand end of the housing 11 there is a second piston 22 of larger area than the piston 14 and which is subjected at its left-hand end to the pressure of hydrogen peroxide conveyed through a pressure tapping 23, referred to hereinbefore as the third pressure tapping, communicating with the pipe 24, connecting the outlet 18 with the steam generator 2. The right-hand end of the piston 22 is subjected to the pressure of hydrogen peroxide delivered by the pump 5 through a pressure tapping 25, referred to hereinbefore as the second pressure tapping. Downstream of the pressure tapping 25 in the delivery pipe 7, there is venturi 26 having at its throat a pressure tapping 27, hereinbefore referred to as the first pressure tapping, leading into the housing 11 at the right-hand end of the piston 14.

The change-over valve 8 contains a pair of inlet valves 32 and 33 which are urged to their closed positions by means of a compression spring 34. The inlet valve 32 opens or closes an inlet from a pipe 38, leading from the delivery pipe 7 upstream of the venturi 26. The valve 33 opens or closes an inlet from the pipe 37, leading from the starting tank 9. Between the valves 32 and 33 there is an outlet to the pipe 39 which communicates with the inlet 17 in the control valve 1.

The operation of the control valve and the associated parts of the hydrogen peroxide control system is as follows:

On starting, when there is no delivery from the pump 5 and thus there is no delivery pressure applied through the pipe 38, the valve 32 will remain closed by the spring 34. Also there is no delivery pressure applied to the right-hand side of the piston 22 through the tapping 25. The pressure of the hydrogen peroxide in the starting tank will open the valve 33 against the spring 34 and thus hydrogen peroxide will pass through the pipe 39 and the inlet 17, around the tapered portion 16 of the piston 14, and through the outlet 18 and the pipe 24 to the steam generator 2. The pressure of the hydrogen peroxide in the pipe 24 is also applied through the tapping 23 to the left-hand side of the piston 22. The piston 22 will therefore move to the right (as viewed in the figure) into contact with left-hand end of the piston 14, which will then be moved thereby to the right against the force of the spring 20, which has been pre-adjusted by means of the screw 21. This movement of the piston 14 reduces the flow of hydrogen peroxide to the steam generator 2 and thus limits the speed of the turbine, which might otherwise overspeed. When the delivery pressure of the pump 5 has increased to a value exceeding the pressure in the pipe 37 and the force of the spring 34, the valve 32 will open and the valve 33 will close. Thus hydrogen peroxide is then supplied to the steam generator 2 by the pump 5 instead of from the starting tank 9. The delivery pressure of the pump will now be applied through the tapping 25 against the right-hand end of the piston 22 which will thereby move to the left, thus reducing the load on the piston 14 and eventually moving clear of the piston 14 as shown in the figure. As the piston 22 moves to the left, the spring 20 will move the piston 14 to the left, thereby to increase the flow area around the tapered portion 16 of the piston 14 and thereby permitting the speed of the turbine 3 to increase to its operational speed. When the latter is reached, the piston 14 will be moved in response to the difference in pressure between the venturi tappings 25 and 27, thereby keeping the turbine speed and hence the speed of the pump 5 substantially constant in response to any variation of the rate of flow delivered by the pump 5. As the ends of piston 14 are of equal area, the resultant loading of the piston 14 is equal to the pressure difference between the tappings 25 and 27 and the force of the spring 20. This can be adjusted by the screw 21, thereby to adjust the operational speed of the turbine to a required value.

What I claim as my invention and desire to secure by Letters Patent of the United States is:

1. A system for supplying an oxidant to a combustion chamber of a rocket engine, the system including a main supply line leading to said combustion engine, flow sensing means in said main supply line, a pump for supplying oxidant to said main supply line, a turbine for driving said pump, a generator for supplying to said turbine working fluid derived from said oxidant, a metering valve by which oxidant is supplied to said generator, a pressurised starting tank for supplying oxidant to said generator via said metering valve and a further valve for stopping the supply of oxidant by said starting tank and effecting supply from said main line when said turbine has reached its operational speed, said metering valve including a valve member, movable to vary the flow area of a passage for oxidant through said metering valve in response to said flow sensing means, and means operable to limit the permitted movement of said valve member in the direction of increasing flow area of said passage, said latter means being operable in response to difference between pressure at a position between said valve member and said turbine, and in said main supply line.

2. A system for supplying an oxidant to a combustion chamber of a rocket engine, the system including a main supply line leading to said combustion engine, flow sensing means including flow restricting means in said main supply line, a pump for supplying oxidant to said main supply line, a turbine for driving said pump, a generator for supplying to said turbine working fluid derived from said oxidant, a metering valve by which oxidant is supplied to said generator, a pressurised starting tank for supplying oxidant to said generator via said metering valve and a further valve for stopping the supply of oxidant by said starting tank and effecting supply from said main line when said turbine has reached its operational speed, said metering valve comprising a housing including a chamber through which oxidant is supplied to said generator, a first piston slidable in said chamber and co-operating therewith to define a flow path therethrough, said flow path being of variable flow area according to the position of the said first piston in said chamber, spring means acting to urge said first piston towards the position of maximum flow area of said flow path, a second piston slidable in said housing and engageable with one end of said first piston in opposition to said spring means, first and second pressure tappings in said housing at opposite ends of said first piston and communicating with said flow restricting means and the main line upstream thereof, and a third pressure tapping in said housing, said second and third tappings being at opposite ends of said second piston and said third tapping communicating with said flow path at a position downstream of said first piston.

3. A system as claimed in claim 2 in which said further valve is a change-over valve having a pair of inlets connected respectively to said starting tank and to said main supply line, an outlet connected to said metering valve and a pressure responsive valve member selectively movable in response to the difference between the pressures at said inlets to close the inlet subjected to the lower of said pressures and to open the inlet subjected to the higher of said pressures.

4. A system for supplying hydrogen peroxide to a combustion chamber of a rocket engine, the system including a main supply line leading to said combustion engine, a venturi in said main supply line, a pump for supplying hydrogen peroxide to said main supply line, a steam turbine for driving said pump, a steam generator for supplying steam to said turbine, a metering valve by which hydrogen peroxide is supplied to said steam generator, a pressurised starting tank for supplying hydrogen peroxide to said steam generator via said metering valve and a further valve for stopping the supply of hydrogen peroxide by said starting tank and effecting supply from said main line when said turbine has reached its operational speed, said metering valve comprising a housing including a chamber through which hydrogen peroxide is supplied to said steam generator, a first piston slidable in said chamber and co-operating therewith to define a flow path therethrough, said flow path being of variable flow area according to the position of the said first piston in said chamber, spring means acting to urge said first piston towards the position of maximum flow area of said flow path, a second piston slidable in said housing and engageable with one end of said first piston in opposition to said spring means, first and second pressure tappings in said housing at opposite ends of said first piston and communicating respectively with the throat of said venturi and a position upstream of the venturi throat, and a third pressure tapping in said housing, said second and third tappings being at opposite ends of said second piston and said third tapping communicating with said flow path at a position downstream of said first piston.

5. A system as claimed in claim 4 in which said further valve is a change-over valve having a pair of inlets connected respectively to said starting tank and to said main supply line, an outlet connected to said metering valve and a pressure responsive valve member selectively movable in response to the difference between the pressures at said inlets to close the inlet subjected to the lower of said pressures and to open the inlet subjected to the higher of said pressures.

References Cited by the Examiner
UNITED STATES PATENTS

| | | | |
|---|---|---|---|
| 2,406,181 | 8/1946 | Wiegand | 91—52 |
| 2,785,532 | 3/1957 | Kretschmer | 60—35.6 |
| 2,949,007 | 8/1960 | Aldrich et al. | 60—35.6 |
| 3,040,522 | 6/1962 | Williamson et al. | 60—35.6 |

JULIUS E. WEST, *Primary Examiner.*